(12) United States Patent
Hussey et al.

(10) Patent No.: US 8,057,610 B2
(45) Date of Patent: Nov. 15, 2011

(54) MONOLITHIC GAS GENERANT GRAINS

(75) Inventors: Brett Hussey, Bountiful, UT (US); Ivan V. Mendenhall, Providence, UT (US); Roger Bradford, Malad City, ID (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/789,057

(22) Filed: May 27, 2010

(65) Prior Publication Data
US 2010/0230945 A1 Sep. 16, 2010

Related U.S. Application Data

(62) Division of application No. 11/472,260, filed on Jun. 21, 2006, now Pat. No. 7,758,709.

(51) Int. Cl.
*C06B 45/00* (2006.01)
*C06B 21/00* (2006.01)
*D03D 23/00* (2006.01)
*D03D 43/00* (2006.01)

(52) U.S. Cl. ......... 149/23; 149/2; 149/108.6; 149/109.4

(58) Field of Classification Search ............... 149/23, 149/2, 108.6, 109.4
See application file for complete search history.

(56) References Cited

U.S. PATENT DOCUMENTS

| | | |
|---|---|---|
| 2,921,521 A | 1/1960 | La Haye et al. |
| 3,255,281 A | 6/1966 | Alexander |
| 3,722,354 A | 3/1973 | Herty, III |
| 3,724,870 A | 4/1973 | Kurokawa et al. |
| 3,912,561 A | 10/1975 | Doin et al. |
| 3,986,908 A | 10/1976 | Grebert et al. |
| 4,000,231 A | 12/1976 | Peterson |
| 4,099,376 A | 7/1978 | Japs |
| 4,131,051 A | 12/1978 | Schaffling |
| 4,246,051 A | 1/1981 | Garner et al. |
| 4,300,962 A | 11/1981 | Stinecipher et al. |

(Continued)

FOREIGN PATENT DOCUMENTS

CN 1303338 7/2001

(Continued)

OTHER PUBLICATIONS

"Extrusion Process," [online]; [retrieved on Oct. 6, 2006], retrieved from http://www.aec.org/techinfo/prntFriend/expro_prntfrnd.html, 4 pp.
"Refinement of tablet compaction models to include compaction kinematics," [online]; [retrieved on Sep. 18, 2006], retrieved from http://www.msm.cam.ac.uk/ccmm/projects/lhh24.html, 6 pp.
The European Search Opinion and Supplementary European Search Report issued on Oct. 1, 2009 for European Patent Application No. 07795162.2 (Published as EP 2035352).

(Continued)

*Primary Examiner* — James McDonough
(74) *Attorney, Agent, or Firm* — Sally J. Brown; Harness Dickey & Pierce PLC

(57) ABSTRACT

A gas generant for an inflatable restraint device (for example, an airbag system for a vehicle) is a monolithic compressed solid that has a linear burn rate of greater than or equal to about 1.6 inches per second at a pressure of about 3,000 pounds per square inch. The gas generant can be in the form of an annular disk having a plurality of apertures. The gas generant may be substantially free of binder and may have a low initial surface area which progressively increases during burning. The gas generant provides a gas generation profile that improves restraint of vehicle occupants, including those occupants that are out-of-position. Additionally, the shaped gas generant decreases occupant exposure to toxic effluent combustion products and solid respirable particulates.

18 Claims, 8 Drawing Sheets

U.S. PATENT DOCUMENTS

| | | |
|---|---|---|
| 4,349,324 A | 9/1982 | Neff et al. |
| 4,608,102 A | 8/1986 | Krampen et al. |
| 4,624,126 A | 11/1986 | Avila et al. |
| 4,632,813 A | 12/1986 | Anastasi et al. |
| 4,640,711 A | 2/1987 | Lichti et al. |
| 4,698,107 A | 10/1987 | Goetz et al. |
| 4,714,579 A | 12/1987 | Boden et al. |
| 4,806,180 A | 2/1989 | Goetz et al. |
| 4,817,828 A | 4/1989 | Goetz |
| 4,828,474 A | 5/1989 | Ballantyne |
| 4,846,368 A | 7/1989 | Goetz |
| 4,923,512 A | 5/1990 | Timm et al. |
| 4,944,528 A | 7/1990 | Nilsson et al. |
| 4,948,439 A | 8/1990 | Poole et al. |
| 4,998,751 A | 3/1991 | Paxton et al. |
| 5,019,220 A | 5/1991 | Taylor et al. |
| 5,034,070 A | 7/1991 | Goetz et al. |
| 5,035,757 A | 7/1991 | Poole |
| 5,051,143 A | 9/1991 | Goetz |
| 5,074,938 A | 12/1991 | Chi |
| 5,139,588 A | 8/1992 | Poole |
| 5,202,067 A | 4/1993 | Solazzi et al. |
| 5,345,873 A | 9/1994 | Lauritzen et al. |
| 5,351,619 A * | 10/1994 | Chan et al. ............... 102/289 |
| 5,388,519 A | 2/1995 | Guindon et al. |
| 5,407,608 A | 4/1995 | Knowlden et al. |
| 5,423,261 A | 6/1995 | Bernardy et al. |
| 5,460,668 A | 10/1995 | Lyon |
| 5,507,520 A | 4/1996 | Meduvsky et al. |
| 5,507,890 A | 4/1996 | Swann et al. |
| 5,518,054 A | 5/1996 | Mitson et al. |
| 5,531,941 A | 7/1996 | Poole |
| 5,538,568 A | 7/1996 | Taylor et al. |
| 5,542,704 A | 8/1996 | Hamilton et al. |
| 5,562,303 A | 10/1996 | Schleicher et al. |
| 5,565,710 A | 10/1996 | Ochi et al. |
| 5,608,183 A | 3/1997 | Barnes et al. |
| 5,623,115 A | 4/1997 | Lauritzen et al. |
| 5,629,494 A | 5/1997 | Barnes et al. |
| 5,635,668 A | 6/1997 | Barnes et al. |
| 5,670,740 A | 9/1997 | Barnes et al. |
| 5,682,013 A | 10/1997 | Smith et al. |
| 5,738,374 A | 4/1998 | Marsaud et al. |
| 5,756,929 A | 5/1998 | Lundstrom et al. |
| 5,756,930 A | 5/1998 | Chan et al. |
| 5,780,767 A | 7/1998 | Matsuda et al. |
| 5,804,758 A | 9/1998 | Marsaud et al. |
| 5,821,449 A * | 10/1998 | Langsjoen et al. ............ 102/288 |
| 5,834,679 A | 11/1998 | Seeger |
| 5,879,421 A | 3/1999 | Liu et al. |
| 5,985,361 A | 11/1999 | Poulter et al. |
| 5,989,367 A | 11/1999 | Zeuner et al. |
| 6,007,736 A | 12/1999 | Zhang et al. |
| 6,029,994 A | 2/2000 | Perotto et al. |
| 6,032,979 A | 3/2000 | Mossi et al. |
| 6,039,820 A | 3/2000 | Hinshaw et al. |
| 6,053,110 A | 4/2000 | Marchant |
| 6,103,030 A | 8/2000 | Taylor et al. |
| 6,129,023 A | 10/2000 | Marsaud et al. |
| 6,132,480 A | 10/2000 | Barnes et al. |
| 6,132,537 A | 10/2000 | Zeuner et al. |
| 6,143,102 A | 11/2000 | Mendenhall et al. |
| 6,156,136 A | 12/2000 | Bottaro et al. |
| 6,205,916 B1 | 3/2001 | Castleton |
| 6,214,138 B1 | 4/2001 | Canterberry et al. |
| 6,224,697 B1 | 5/2001 | Mendenhall |
| 6,301,935 B1 | 10/2001 | Audenaert et al. |
| 6,315,930 B1 | 11/2001 | Hamilton |
| 6,322,649 B1 | 11/2001 | Marsaud et al. |
| 6,368,434 B1 | 4/2002 | Espagnacq et al. |
| 6,427,599 B1 | 8/2002 | Posson et al. |
| 6,517,647 B1 | 2/2003 | Yamato |
| 6,550,808 B1 | 4/2003 | Mendenhall |
| 6,592,691 B2 | 7/2003 | Taylor et al. |
| 6,605,233 B2 | 8/2003 | Knowlton et al. |
| 6,620,266 B1 | 9/2003 | Williams et al. |
| 6,634,302 B1 | 10/2003 | Rink et al. |
| 6,688,231 B1 | 2/2004 | Herrmann |
| 6,689,237 B1 | 2/2004 | Mendenhall |
| 6,712,918 B2 | 3/2004 | Mendenhall et al. |
| 6,752,939 B2 | 6/2004 | Gereg |
| 6,789,485 B2 | 9/2004 | Moquin et al. |
| 6,843,869 B2 | 1/2005 | Mendenhall et al. |
| 6,905,562 B2 | 6/2005 | Hamilton |
| 6,935,655 B2 | 8/2005 | Longhurst et al. |
| 6,941,868 B2 | 9/2005 | Herget |
| 6,958,101 B2 | 10/2005 | Mendenhall et al. |
| 6,984,398 B2 | 1/2006 | Brennan et al. |
| 7,024,342 B1 | 4/2006 | Waite et al. |
| 7,077,428 B2 | 7/2006 | Barker et al. |
| 7,147,733 B2 | 12/2006 | Barnes et al. |
| 7,470,337 B2 | 12/2008 | Mendenhall et al. |
| 7,758,709 B2 | 7/2010 | Hussey et al. |
| 7,814,838 B2 | 10/2010 | McCormick |
| 2002/0195181 A1 | 12/2002 | Lundstrom et al. |
| 2003/0037850 A1 | 2/2003 | Helmy et al. |
| 2003/0089883 A1 | 5/2003 | Knowlton et al. |
| 2004/0000362 A1 | 1/2004 | Sato et al. |
| 2004/0050283 A1 | 3/2004 | Daoud |
| 2004/0112244 A1 | 6/2004 | Barker et al. |
| 2004/0154712 A1 | 8/2004 | Yokoyama et al. |
| 2004/0173922 A1 | 9/2004 | Barnes et al. |
| 2004/0200554 A1 * | 10/2004 | Mendenhall et al. .......... 149/36 |
| 2004/0216820 A1 | 11/2004 | Mendenhall et al. |
| 2005/0067076 A1 | 3/2005 | Barnes et al. |
| 2005/0115721 A1 | 6/2005 | Blau et al. |
| 2005/0263223 A1 | 12/2005 | Halpin et al. |
| 2006/0016529 A1 | 1/2006 | Barnes et al. |
| 2006/0054257 A1 | 3/2006 | Mendenhall et al. |
| 2006/0102259 A1 | 5/2006 | Taylor et al. |
| 2007/0084531 A1 | 4/2007 | Halpin et al. |
| 2007/0240797 A1 | 10/2007 | Mendenhall et al. |
| 2007/0277915 A1 | 12/2007 | Hordos |
| 2007/0296190 A1 | 12/2007 | Hussey et al. |
| 2008/0236711 A1 | 10/2008 | Bradford et al. |
| 2009/0044885 A1 | 2/2009 | Brisighella et al. |
| 2009/0044886 A1 | 2/2009 | Brisighella et al. |
| 2009/0205757 A1 | 8/2009 | Gaudre et al. |
| 2009/0255611 A1 | 10/2009 | Lund et al. |
| 2009/0308509 A1 | 12/2009 | Marlin |
| 2010/0116384 A1 | 5/2010 | Mendenhall et al. |
| 2011/0025030 A1 | 2/2011 | Mendenhall et al. |

FOREIGN PATENT DOCUMENTS

| | | |
|---|---|---|
| CN | 101506125 | 8/2009 |
| CN | 101952227 | 1/2011 |
| DE | 3933555 | 2/1991 |
| DE | 4006741 | 8/1991 |
| DE | 19501889 | 7/1995 |
| DE | 4318883 | 12/2003 |
| EP | 0324639 | 7/1989 |
| EP | 0757026 | 6/1996 |
| EP | 0728630 | 8/1996 |
| EP | 0767155 | 4/1997 |
| EP | 0870746 | 4/1998 |
| EP | 1118512 | 7/2001 |
| EP | 1142853 | 10/2001 |
| EP | 2035352 | 11/2009 |
| EP | 2190801 | 6/2010 |
| EP | 2265562 | 12/2010 |
| EP | 2346797 | 7/2011 |
| FR | 2873367 | 1/2006 |
| GB | 2219242 | 12/1989 |
| JP | 2010536691 | 12/2010 |
| JP | 2011516395 | 5/2011 |
| WO | WO 89/10257 | 11/1989 |
| WO | WO 99/05079 | 2/1999 |
| WO | WO 01/008937 | 2/2001 |
| WO | WO 03/106378 | 12/2003 |
| WO | WO 2004/024653 | 3/2004 |
| WO | WO 2004/067477 | 8/2004 |
| WO | WO 2006/134311 | 12/2006 |
| WO | WO 2007/042735 | 4/2007 |
| WO | WO 2007/113299 | 10/2007 |
| WO | WO 2007/149173 | 12/2007 |
| WO | WO 2008/035288 | 3/2008 |
| WO | WO 2008/051274 | 5/2008 |

| WO | WO 2008/118273 | 10/2008 |
| --- | --- | --- |
| WO | WO 2009/023119 | 2/2009 |
| WO | WO 2009/126182 | 10/2009 |
| WO | WO 2009/126702 | 10/2009 |
| WO | WO 2010/056512 | 5/2010 |
| WO | WO 2011/017192 | 2/2011 |

OTHER PUBLICATIONS

The International Search Report issued on Jul. 30, 2009 for PCT International Application No. PCT/US08/009472 (Published as WO 09/023119).
The International Search Report issued on May 18, 2009 for PCT International Application No. PCT/US09/039895 (Published as WO 09/126702).
The International Search Report issued on Sep. 25, 2009 for PCT International Application No. PCT/US08/079750 (Published as WO 09/126182).
The International Search Report issued on Jul. 3, 2008 for PCT International Application No. PCT/US07/012169 (Published as WO 07/149173).
"The Use of MADYMO to Elucidate Injury Mechanisms in a Complex, Multiple-Impact Collision," [online]; [retrieved on Feb. 5, 2008], retrieved from http://www-nrd.nhtsa.dot.gov/pdf/nrd-50/ciren/2002/0802fairfax.pdf, 32 pp.
Communication from the European Examining Division dated Mar. 31, 2010 for European Patent Application No. 07795162.2 (Published as EP 2035352).
Applicants' Response to communication from the European Examining Division dated Mar. 31, 2010 for European Patent Application No. 07795162.2 (Published as EP 2035352) as filed on Sep. 23, 2010.
Web page, 1995-2008 Cabot Corporation, Overview of CAB-O-SIL® Untreated Fumed Silicas, http://www.cabot-corp.com/cws/businesses.nsf/CWSID/cswBUS01182001034300PM9596?_OpenDocument, downloaded Oct. 27, 2008, 1 page.
Web page, U.S. Silica Company, MIN-U-SIL® 40, Jan. 7, 1999, http://www.u-s-silica.com/PDS/Berkley?BerMUS4020000.PDF, downloaded Nov. 10, 2008, 1 page.
Web page, Fibertec Inc., Fibertec Functional Fillers—Microglass Milled Glass Fibers, http://www.fibertecinc.com/microglass.htm, downloaded Oct. 27, 2008, 3 pages.
Appeal Brief as filed on Aug. 1, 2011 in co-pending cross-referenced U.S. Appl. No. 11/691,753.
Notice of Appeal and Pre-Appeal Brief Request for Review as filed on Aug. 8, 2011 in co-pending cross-referenced U.S. Appl. No. 12/269,333.
Office Action dated Aug. 11, 2011 issued in co-pending cross-referenced U.S. Appl. No. 12/534,617.
The International Search Report and Written Opinion of the International Searching Authority issued on Dec. 22, 2009 for International Application No. PCT/US09/62223 (published as WO 2010/056512).
The International Preliminary Report on Patentability issued on May 17, 2011 for International Application No. PCT/US09/62223 (published as WO 2010/056512).
The International Search Report and Written Opinion of the International Searching Authority issued on Sep. 18, 2008 for International Application No. PCT/US08/02654 (published as WO 08/118273).
The International Preliminary Report on Patentability issued on Sep. 29, 2009 for International Application No. PCT/US08/02654 (published as WO 08/118273).
The Written Opinion of the International Searching Authority issued on May 18, 2009 for International Application No. PCT/US2009/039895 (published as WO 2009/126702).
The International Preliminary Report on Patentability issued on Oct. 12, 2010 for International Application No. PCT/US2009/039895 (published as WO 2009/126702).
The Written Opinion of the International Searching Authority issued on Jul. 3, 2008 for International Application No. PCT/US2007/012169 (published as WO 2007/149173).
The International Preliminary Report on Patentability issued on Dec. 22, 2008 for International Application No. PCT/US2007/012169 (published as WO 2007/149173).

The Written Opinion of the International Searching Authority issued on Sep. 25, 2009 for International Application No. PCT/US2008/079750 (published as WO 2009/126182).
The International Preliminary Report on Patentability issued on Oct. 12, 2010 for International Application No. PCT/US2008/079750 (published as WO 2009/126182).
The International Written Opinion of the International Searching Authority issued on Jul. 30, 2009 for International Application No. PCT/US2008/009472 (published as WO 2009/023119).
The International Preliminary Report on Patentability issued on Feb. 16, 2010 for International Application No. PCT/US2008/009472 (published as WO 2009/023119).
The International Search Report and Written Opinion of the International Searching Authority issued on Sep. 13, 2010 for International Application No. PCT/US2010/043718 (published as WO 2011/017192).
The First Office Action issued by the State Intellectual Property Office of the People's Republic of China on Mar. 9, 2011 in related Chinese Patent Application No. CN 200780031197.3 (5 pages) and the English translation as provided by Boss & Young (9 pages).
Mar. 31, 2011 Reply to Final Office Action dated Jan. 31, 2011 issued in co-pending cross-referenced U.S. Appl. No. 11/837,842.
Interview Summary and Advisory Action dated Apr. 13, 2011 issued in co-pending cross-referenced U.S. Appl. No. 11/837,842.
Request for Continued Examination and Reply to Final Office Action dated Jan. 31, 2011 and Advisory Action dated Apr. 13, 2011 issued in co-pending cross-referenced U.S. Appl. No. 11/837,842, filed May 2, 2011.
Communication issued by the European Patent Office on Mar. 31, 2010 in European Patent Application No. 07795162.2-1221.
Applicants' Response to Communication from the European Examining Division dated Mar. 31, 2010 for European Patent Application No. 07795162.2 (Published as EP 2035352) as filed on Sep. 23, 2010.
Communication issued by the European Patent Office on Jan. 19, 2011 in related European Patent Application No. 08 795 096.0-1221.
Applicants' Response to Communication from the European Examining Division dated Jan. 19, 2011 for European Patent Application No. 08 795 096.0-1221 as filed on Apr. 28, 2011.
Final Office Action dated Feb. 16, 2011 issued in co-pending cross-referenced U.S. Appl. No. 11/837,831.
Reply to Final Office Action dated Feb. 16, 2011 issued in co-pending cross-referenced U.S. Appl. No. 11/837,831, filed Apr. 14, 2011.
Advisory Action dated May 3, 2011 issued in co-pending cross-referenced U.S. Appl. No. 11/837,831.
Interview Summary dated May 4, 2011 issued in co-pending cross-referenced U.S. Appl. No. 11/837,831.
Request for Continued Examination and Response to Final Office Action dated Feb. 16, 2011 and Advisory Action dated May 3, 2011 issued in co-pending cross-referenced U.S. Appl. No. 11/837,831, filed Jul. 18, 2011.
Reply to Final Office Action dated Feb. 1, 2011 issued in co-pending cross-referenced U.S. Appl. No. 11/691,753, filed Apr. 1, 2011.
Interview Summary and Advisory Action dated Apr. 26, 2011 issued in co-pending cross-referenced U.S. Appl. No. 11/691,753.
Response to Interview Summary dated Apr. 26, 2011 issued in co-pending cross-referenced U.S. Appl. No. 11/691,753, filed May 24, 2011.
Notice of Appeal filed on Jun. 1, 2011 in co-pending cross-referenced U.S. Appl. No. 11/691,753.
Response to Non-Final Office Action dated Dec. 16, 2010 issued in co-pending cross-referenced U.S. Appl. No. 12/269,333, filed Mar. 16, 2011.
Final Office Action dated Apr. 7, 2011 issued in co-pending cross-referenced U.S. Appl. No. 12/269,333.
Reply to Final Office Action dated Apr. 7, 2011 issued in co-pending cross-referenced U.S. Appl. No. 12/269,333, filed Jun. 7, 2011.
Advisory Action dated Jun. 20, 2011 issued in co-pending cross-referenced U.S. Appl. No. 12/269,333.

* cited by examiner

MONOLITHIC GAS GENERANT GRAINS

CROSS-REFERENCE TO RELATED APPLICATIONS

This is a divisional application of U.S. patent application Ser. No. 11/472,260 filed on Jun. 21, 2006, the entire disclosure of which is incorporated herein by reference.

FIELD

The present disclosure relates to inflatable restraint systems and more particularly to pyrotechnic gas generant materials for use in such systems.

BACKGROUND

The statements in this section merely provide background information related to the present disclosure and may not constitute prior art.

Passive inflatable restraint systems are often used in a variety of applications, such as in motor vehicles. When a vehicle decelerates due to a collision, an inflatable restraint system deploys an airbag cushion to prevent contact between the occupant and the vehicle, thus minimizing occupant injuries. Such devices usually employ an inflator that can include a pyrotechnic gas generant. The gas generants burn very rapidly to generate heated gas that inflates an airbag. The inflatable device generally requires a sustained gas pressure in the airbag (generally over 5-10 pounds per square inch for at least 40 to 150 milliseconds) to restrain the occupant relative to the vehicle. Thus, gas generants provide gases that fulfill these requirements.

Sometimes, vehicle occupants are not in a predetermined position to receive the benefits of airbag deployment. If the rate of pressure increase in the airbag is too rapid and the amount of pressure generated by the gas generant is excessive, then an out-of-position occupant may not receive the desired benefits of the airbag.

Improvements in gas generant performance remain desirable. Tailoring the performance of the gas generant in an inflatable device system, such as an airbag, can require a complex design of not only the gas generant, but also hardware systems that control gas flow. It is preferred that gas generants for inflators of inflatable restraint devices rapidly generate gases during combustion at desired pressure levels and rates to achieve superior performance and to improve out-of-position performance. Likewise, gas generant materials are preferably safe for handling, have high gas yields and acceptable flame temperatures, with burning rates appropriate to the generant web thickness. Gas generants that fulfill these requirements and further minimize the production of byproduct compounds in effluent gases released through the airbag are highly desirable.

SUMMARY

According to various aspects, the present disclosure provides a gas generant. In certain embodiments, the gas generant comprises a substituted basic metal nitrate reaction product formed by reacting an acidic organic compound comprising a heterocyclic nitrogen-containing compound with a basic metal nitrate. In various embodiments, the gas generant has a linear burn rate of greater than or equal to about 1.6 inches per second at a pressure of about 3,000 pounds per square inch. Further, it is preferred that the gas generant is substantially free of polymeric binder.

In other aspect, the disclosure provides a pressed monolithic gas generant for an inflatable restraint device comprising an annular disk having a plurality of apertures. The plurality of apertures have a ratio of length to diameter of about 3.5 to about 8. An initial surface area of the disk is less than about 13,000 mm$^2$. A linear burn rate of the gas generant is greater than or equal to about 1.6 inches per second at a pressure of about 3,000 pounds per square inch. Further, a product of a mass density and a gas yield of the gas generant is greater than or equal to about 5.0 moles/100 cm$^3$. The gas generant is substantially free of polymeric binder.

According to other aspects, the present disclosure provides an inflatable restraint device. The inflatable restraint device comprises an airbag and a gas generant for inflating the airbag. The airbag restrains motion of a vehicle occupant. The device comprises at least one gas generant in the form of a monolithic annular disk having a plurality of apertures and has a linear burn rate of greater than or equal to about 1.6 inches per second at a pressure of about 3,000 pounds per square inch. Further, the gas generant is substantially free of a polymeric binder.

According to some aspects of the present disclosure, a gas generant for an inflatable restraint device comprises an annular disk having a plurality of apertures, wherein a linear burn rate of the gas generant is greater than or equal to about 1.6 inches per second at a pressure of about 3,000 pounds per square inch. The gas generant is substantially free of polymeric binder. In some aspects, the gas generant is also preferably substantially free of perchlorate-containing oxidizing agents. In certain aspects, the gas generant also has a product of a mass density and a gas yield that is greater than or equal to about 5.0 moles/100 cm$^3$.

According to yet other aspects of the present disclosure, a pressed monolithic gas generant for an inflatable restraint device comprises an annular disk having a plurality of apertures. The plurality of apertures each has a ratio of length to diameter of about 3.5 to about 8. An initial surface area of the disk is preferably less than about 13,000 mm$^2$ and a linear burn rate of the gas generant is greater than or equal to about 1.6 inches per second at a pressure of about 3,000 pounds per square inch. Further, the gas generant preferably has a product of mass density of the gas generant and gas yield of the generant (per 100 g) that is greater than or equal to about 5.2 moles/100 cm$^3$. The gas generant is preferably substantially free of polymeric binder.

In yet other aspect, the disclosure provides a gas generant for an inflatable restraint device comprising an annular disk having a plurality of apertures. The gas generant has a linear burn rate of greater than or equal to about 1.6 inches per second at a pressure of about 3,000 pounds per square inch. A product of a mass density and a gas yield of the gas generant is greater than or equal to about 5.0 moles/100 cm$^3$. The gas generant is substantially free of polymeric binder and perchlorate-containing oxidizing agents.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7:
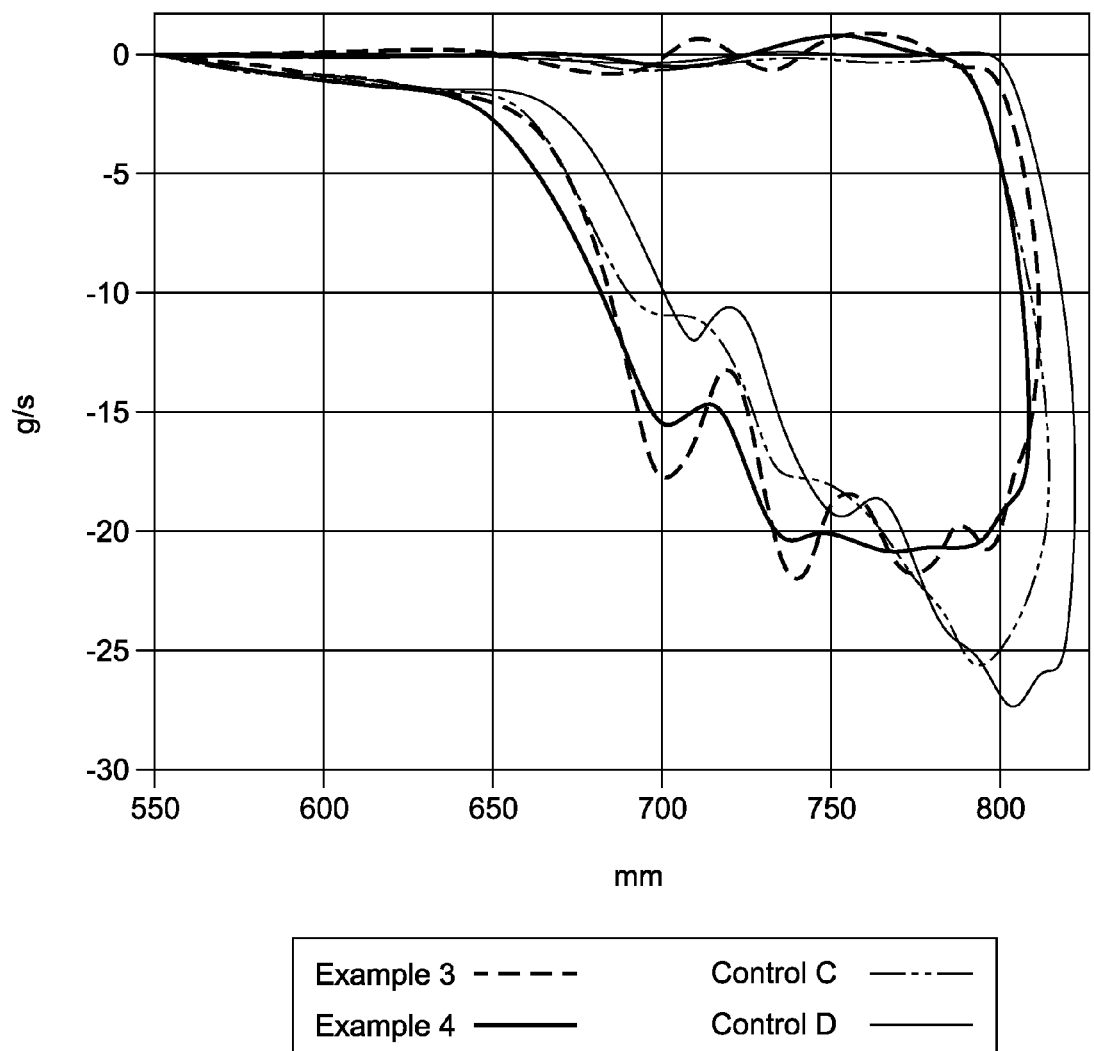
Figure 8:
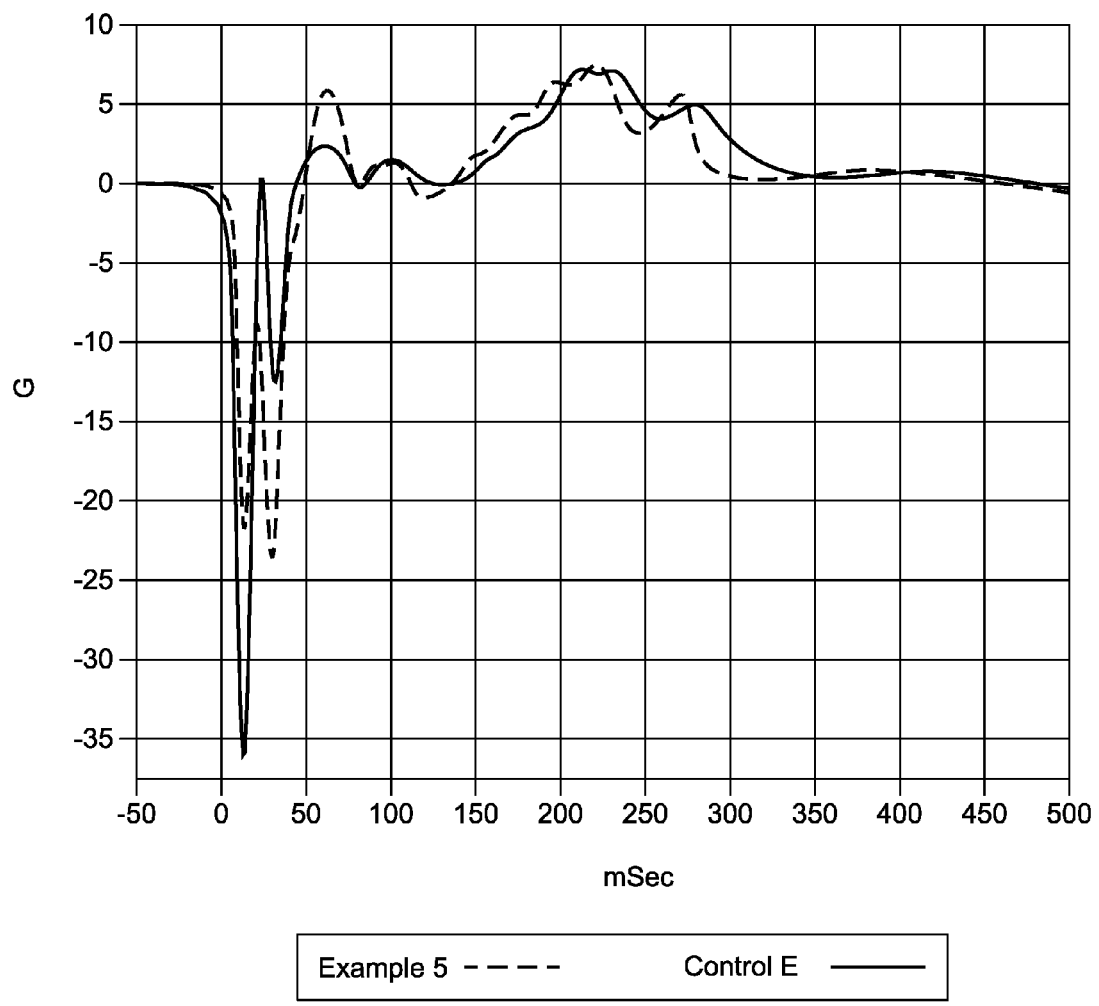

FIG. 7 compares linear impactor G force for a monolith gas generant grain according to certain embodiments of the present disclosure with a conventional gas generant pellet; and FIG. 8 shows OOP maximum G force results of a monolith gas generant grain according to certain embodiments of the present disclosure as compared to a conventional gas generant pellet.

DESCRIPTION OF VARIOUS ASPECTS

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

Inflatable restraint devices preferably generate gas in situ from a reaction of a pyrotechnic gas generant contained therein. In accordance with various aspects of the present disclosure, gas generants are provided that have desirable compositions and shapes that result in superior performance characteristics in an inflatable restraint device. In preferred embodiments, the gas generants have a high burn rate (i.e., rate of combustion reaction), a high gas yield (moles/mass of generant), a high achieved mass density, a high theoretical density, a high loading density, are substantially free of binder, and are formed in unique shapes that optimize the ballistic burning profiles of the materials contained therein.

By way of background, inflatable restraint devices have applicability for various types of airbag module assemblies for automotive vehicles, such as driver side, passenger side, side impact, curtain and carpet airbag assemblies, for example, as well as with other types of vehicles including, for example, boats, airplanes, and trains. Such pyrotechnic gas generants can also be used in other applications where rapid generation of gas is required, such as seat belt restraints, for example.

Figure 1:
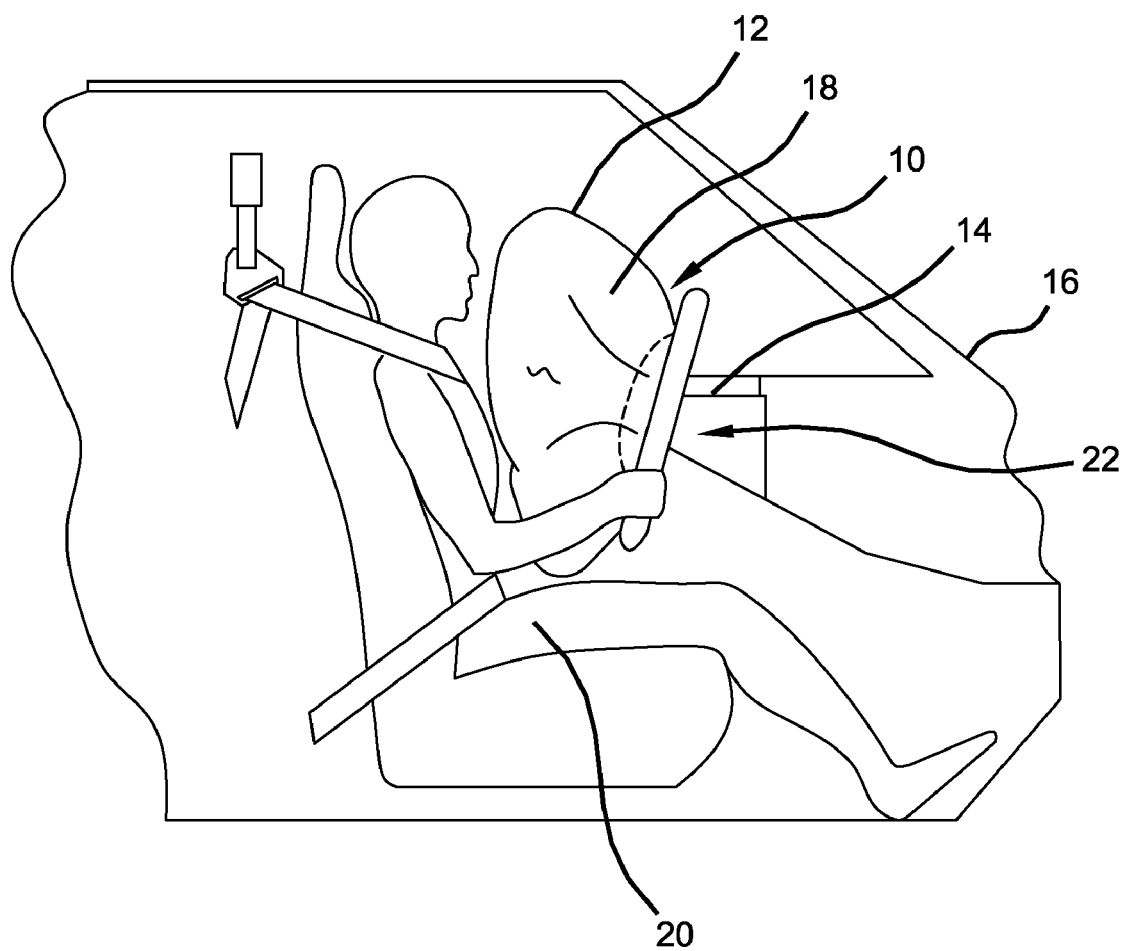
FIG. 1 is a simplified partial side view of an exemplary passive inflatable airbag device system in a vehicle having an occupant.

As discussed herein, exemplary inflatable restraint devices will be referred to as airbag assemblies for purposes of illustration. FIG. 1 shows an exemplary driver-side front airbag inflatable restraint device 10. Such driver side, inflatable restraint devices typically comprise an airbag cushion 12 that is stored within a steering column 14 of a vehicle 16. A gas generant contained in an inflator (not shown) in the steering column 14 creates rapidly expanding gas 18 that inflates the airbag 12. The airbag 12 deploys within milliseconds of detection of deceleration of the vehicle 16 and creates a barrier between a vehicle occupant 20 and the vehicle components 22, thus minimizing injuries.

Inflatable restraint devices typically involve a series of reactions, which facilitate production of inflation gas to deploy the airbag. Upon actuation of the entire airbag assembly system, the airbag cushion should begin to inflate within the course of a few milliseconds.

Figure 2:
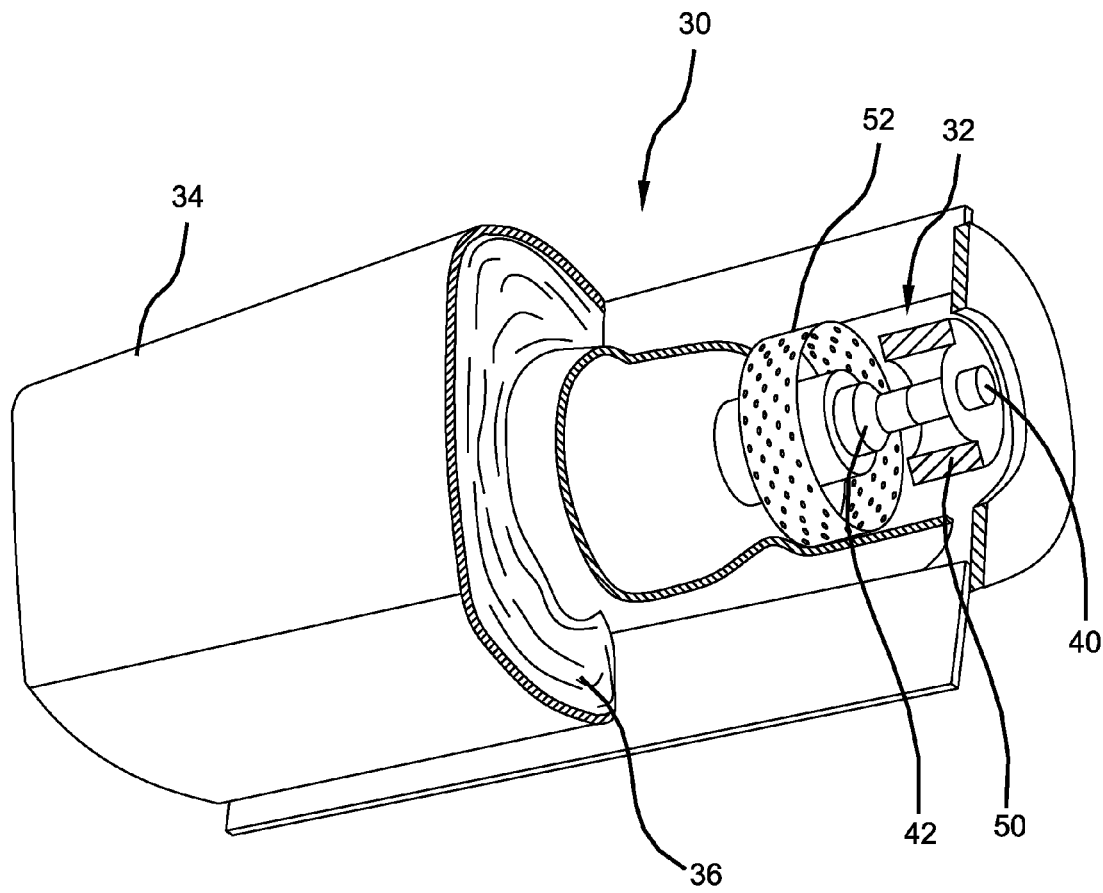
FIG. 2 is an exemplary partial cross-sectional view of a passenger-side airbag module including an inflator for an inflatable airbag restraint device.

FIG. 2 shows a simplified exemplary airbag module 30 comprising a passenger compartment inflator assembly 32 and a covered compartment 34 to store an airbag 36. Such devices often use a squib or initiator 40 which is electrically ignited when rapid deceleration and/or collision is sensed. The discharge from the squib 40 usually ignites an igniter material 42 that burns rapidly and exothermically, in turn, igniting a gas generant material 50. The gas generant material 50 burns to produce the majority of gas products that are directed to the airbag 36 to provide inflation.

In various embodiments, a gas generant 50 is a solid grain that comprises a pyrotechnic material. The pyrotechnic material consists of a fuel, an oxidizer, and other minor ingredients that when ignited combust rapidly to form gaseous reaction products (for example, $CO_2$, $H_2O$, and $N_2$). Gas generants are also known in the art as ignition materials and/or propellants. Thus, a gas generant material comprises one or more compounds that are ignited and undergo rapid combustion reaction(s) forming heat and gaseous products, i.e., the gas generant 50 burns to create heated inflation gas for an inflatable restraint device.

In various embodiments, a gas generant 50 is a solid grain that comprises a pyrotechnic material. Impurities and other materials present within the gas generant 50 facilitate the formation of various other compounds during the combustion reaction(s), including additional gases, aerosols, and particulates. Often, a slag or clinker is formed near the gas generant 50 during burning. The slag/clinker often serves to sequester various particulates and other compounds. However, a filter 52 is often additionally provided between the gas generant 50 and airbag 36 to remove particulates entrained in the gas and to reduce gas temperature of the gases prior to entering the airbag 36. The quality and toxicity of the components of the gas produced by the gas generant 50, also referred to as effluent, are important because occupants of the vehicle are potentially exposed to these compounds. It is desirable to minimize the concentration of potentially harmful compounds in the effluent.

Figure 3:
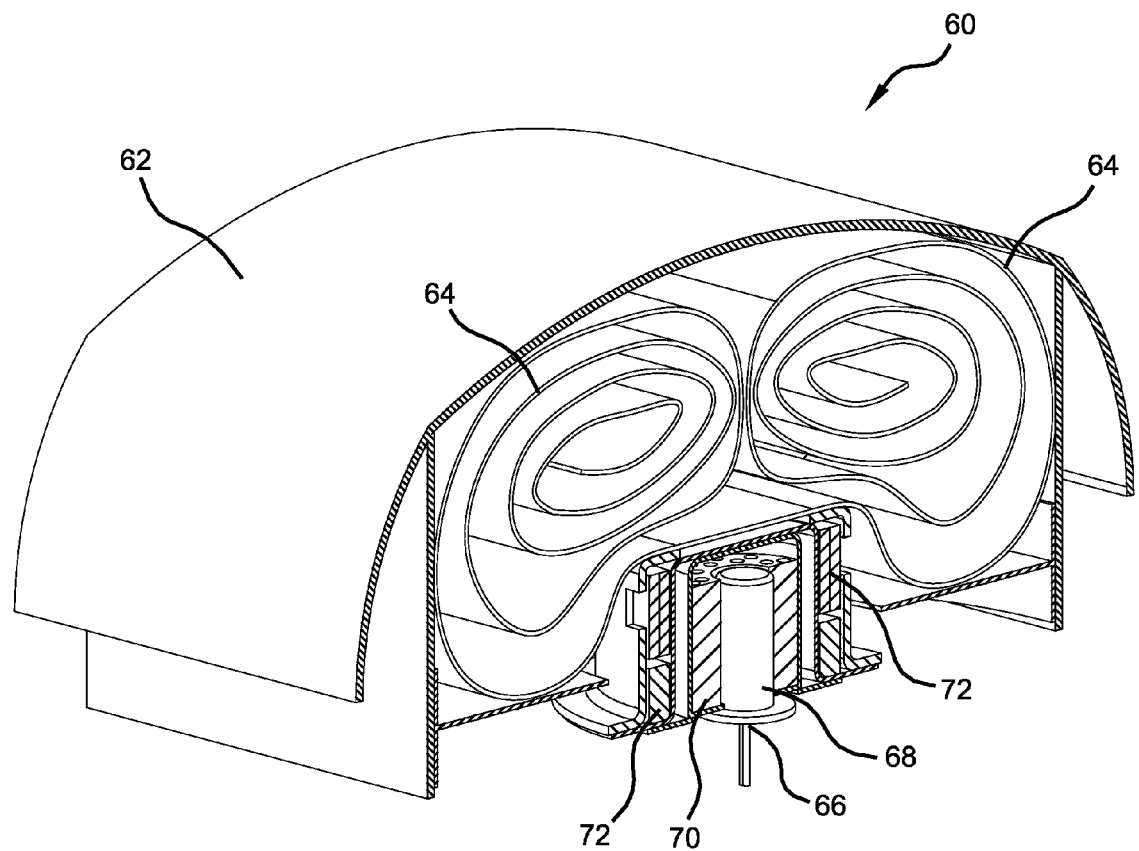
FIG. 3 is an exemplary partial cross-sectional view of a driver-side airbag module including an inflator for an inflatable airbag restraint device.

FIG. 3 shows a simplified exemplary driver side airbag module 60 with a covered compartment 62 to store an airbag 64. A squib 66 is centrally disposed within an igniter material 68 that burns rapidly and exothermically, in turn, igniting a gas generant material 70. Filters 72 are provided to reduce particulate in effluent gases entering the airbag 64 as it inflates.

Various different gas generant compositions (50 or 70) are used in vehicular occupant inflatable restraint systems. As described above, gas generant material selection involves various factors, including meeting current industry performance specifications, guidelines and standards, generating safe gases or effluents, handling safety of the gas generant materials, durational stability of the materials, and cost-effectiveness in manufacture, among other considerations. It is preferred that the gas generant compositions are safe during handling, storage, and disposal, and preferably are azide-free.

The ballistic properties of a gas generant, such as 50 or 70 shown in FIGS. 2 and 3, are typically controlled by the gas generant material composition, shape and surface area, as well as the burn rate of the material. Conventional gas generant materials comprise at least one fuel, an oxidizer, and at least one binder. Binders are typically mixed with the various constituents of the gas generant. Binders serve to retain the shape of the gas generant solids, particularly when they are formed via extrusion and/or molding. For example, a dry blended mixture of various gas generant components can be mixed with a liquid binder resin, extruded, and then cured. Alternatively, solid polymeric binder particles can be dissolved in a solvent or heated to the melting point, then mixed with other gas generant components and extruded or molded. However, gas generant solids formed by such methods are only subjected to relatively low to moderate compressive forces due to the nature of the manufacturing methods and relative compressive force applied. Thus, the presence of a binder is required to retain shape and prevent fracture during storage and use.

Most of the above described formation methods require a binder, such as polymeric binders, including organic film formers, inorganic polymers, thermoplastic and/or thermoset polymers. Examples of common polymeric binders include, but are not limited to: natural gums, cellulosic esters, polyacrylates, polystyrenes, silicones, polyesters, polyethers, polybutadiene, and the like.

However, the presence of polymeric binders in conventional gas generants poses several potential issues. First, during the combustion of the fuel and oxidizer, the binder is likewise burned and/or volatilized, which potentially generates undesirable byproducts in the gas/effluent. Thus, generation of such byproducts requires appropriate treatment and/or sequestration. Second, binder resin is a diluent and slows otherwise rapid reaction of the chemical materials in the gas generant. In some circumstances, the burning rate of gas generants having certain binders is so severely compromised that monolithic shapes have previously not been industrial practicable. Since the presence of the binder slows the rate of reaction of the gas generant, other compounds are often added to compensate for the binder (thereby boosting the reaction rate). These additives include co-oxidants, which increase both cost and potentially create undesirable species in the effluent. For example, perchlorate-containing oxidants generate chloride containing gaseous byproducts (e.g., HCl, NaCl, or KCl) which are undesirable in the effluent byproduct. Some of the co-oxidants typically used also increase the combustion flame temperature of the formulation which can increase the amount of undesirable gaseous effluents and require additional cooling of the gases. Furthermore, the salts usually obtained produce undesirable effluent particulates.

In accordance with the present disclosure, the gas generant materials are substantially free of polymeric binder. The term "substantially free" as referred to herein is intended to mean that the compound is absent to the extent that that undesirable and/or detrimental effects are avoided. In the present embodiment, a gas generant that is "substantially free" of binder comprises less than about 5% by weight binder, more preferably less than about 4% by weight, optionally less than about 3% by weight, optionally less than about 2% by weight, optionally less than about 1% by weight binder, and in certain embodiments comprises 0% by weight of the binder. The gas generant compositions of the present disclosure thus avoid production of undesirable byproduct species potentially generated in effluent by the burning and/or volatilization of the binder resins as the gas generant burns. Further, gas generants that are substantially free of binders have significantly improved burn characteristics (i.e. higher burning rate).

In this regard, certain gas generant materials have a compressed monolithic grain shape and further have an actual density that is greater than or equal to about 90% of the maximum theoretical density. According to certain aspects of the present disclosure, the actual density is greater than or equal to about 93%, more preferably greater than about 95% of the maximum theoretical density, and even more preferably greater than about 97% of the maximum theoretical density. In some embodiments, the actual density exceeds about 98% of the maximum theoretical density of the gas generant material. Such high actual mass densities in gas generant materials are obtained in certain methods of forming gas generant grains in accordance with various aspects of the present disclosure, where high compressive force is applied to gas generant raw materials that are substantially free of binder.

In accordance with the present disclosure, the gas generant materials are in a dry powderized and/or pulverized form. The dry powders are compressed with applied forces greater than about 50,000 psi (approximately 350 MPa), preferably greater than about 60,000 psi (approximately 400 MPa), more preferably greater than about 65,000 psi (approximately 450 MPa), and most preferably greater than about 74,000 psi (approximately 500 MPa). The powderized materials can be placed in a die or mold, where the applied force compresses the materials to form a desired grain shape. While not limiting as to any particular theory by which the teachings of the present disclosure operate, it is believed that a high actual density as compared to the theoretical mass density is important because the gas generant grain holds its shape during combustion (rather than fracturing and/or pulverizing), which assists in maintaining the desirable performance characteristics, such as progressive surface area exposure, burn profile, combustion pressure, and the like. These aspects of performance improve both out-of-position occupant performance and eliminate the need for a two-stage driver inflatable restraint device assembly, as will be described in more detail below.

Further, it is preferred that a loading density of the gas generant is relatively high, otherwise a low performance for a given envelope may result. A loading density is an actual volume of generant material divided by the total volume available for the shape. In accordance with various aspects of the present disclosure, it is preferred that a loading density for the gas generant is greater than or equal to about 60%, even more preferably greater than or equal to about 62%. In certain aspects, a gas generant has loading density of about 62 to about 63%.

Various aspects of the present disclosure provide a gas generant having a monolithic grain shape tailored to create rapid heated gas. The grain shape has a desired surface area and shape to facilitate prolonged reaction and to create preferred gas production profiles at the desired pressures, as will be described in more detail below. The absence of the binder further enables development of desirable burn and pressure profiles. It is the combination of the selected gas generant material composition, initial surface area, shape, and density of the monolithic gas generant grain that maximizes the desired performance results, which is facilitated by the removal of binder that would otherwise impede rapid reaction.

In accordance with various aspects of the present disclosure, a monolithic gas generant grain is created via certain processing steps to have a specific shape that enables such desirable properties. In certain embodiments, the gas generant is in the form of a single large grain, where a grain shape provides increasing surface area as the grain burns. In certain embodiments, one or more of such monolithic grains can be used in an inflator of an inflatable restraint device. The desired shape of the monolithic grain is linked to ballistic characteristics of the composition. The shape of the monolithic grain augments and controls the burn rate of the gas generant composition. The rate of generation of gas from a gas generant can be expressed by the following equation: $m_g = \rho_g A_b y r$ where "$m_g$" is a gas generation rate (mass per unit time), "$\rho_g$" density of the gas generant, "$A_b$"=burning area of the surface, "y" is a multiplication factor defined as the generant gas yield and "r" is the mass burning rate, also known as the surface recession rate (length per unit time). The burning rate is an empirically determined function of the gas generant grain composition, and depends upon various factors including initial temperature of the gas generant, combustion pressure, velocity of gaseous combustion products over the surface of the solid, and the gas generant grain shape. A linear burn rate "$r_L$" for a gas generant material is independent of the surface of the gas generant grain shape and is also expressed in length per time at a given pressure.

In various embodiments, a desirably high burning rate enables desirable pressure curves for inflation of an airbag. In this regard, an initial surface area of the monolithic grain is relatively low as compared to surface areas of traditional pellets and/or wafers, as will be described in more detail below. However, as the preferred monolithic grain shapes of the present disclosure are burned, more surface area is progressively exposed, thus the amount of the composition combusting ($m_g$) progressively becomes greater and generates a higher quantity of gas.

In accordance with various aspects of the present disclosure, the gas generant has a linear burn rate of greater than or equal to about 1.5 inches per second at a pressure of about 3,000 pounds per square inch (psi). In certain embodiments, the burn rate for the gas generant is greater than or equal to about 1.6 inches per second at a pressure of about 3,000 psi. In certain embodiments, the linear burn rate of the gas generant is greater than or equal to about 1.8 inches per second, optionally greater than or equal to about 2.0 inches per second at a pressure of about 3,000 psi. In certain embodiments, the burning rate of the gas generant is less than or equal to about 2.3 inches per second at a pressure of 3,000 psi.

Additionally, it is preferred that the gas generant has a high mass density in various embodiments. For example, in certain embodiments, the gas generant has a theoretical mass density of greater than about 1.9 g/cm$^3$, preferably greater than about 1.94 g/cm$^3$, and even more preferably greater than or equal to about 2.12 g/cm$^3$.

Further, in accordance with the present disclosure, the gas yield of the gas generant is relatively high. For example, in certain embodiments, the gas yield is greater than or equal to about 2.4 moles/100 grams of gas generant. In other embodiments, the gas yield is greater than or equal to about 2.5 moles/100 g of gas generant.

Expressed in another way, the amount of gas produced for a given mass of gas generant present at a specific volume is relatively high. In this regard, the product of gas yield and density is an important parameter for predicting performance of the gas generant. A product of gas yield and density (of the gas generant) is preferably greater than about 5.0 moles/100 cm$^3$, and even more preferably greater than about 5.2 moles/100 cm$^3$, in various embodiments.

Suitable examples of gas generant compositions having suitable burn rates, density, and gas yield for inclusion in the gas generants of the present disclosure include those described in U.S. Pat. No. 6,958,101 to Mendenhall et al., the disclosure of which is herein incorporated by reference in its entirety. However, any suitable fuels known or to be developed in the art that can provide gas generants having the desired burn rates, gas yields, and density described above are contemplated for use in various embodiments of the present disclosure.

Suitable pyrotechnic materials for the gas generants of the present disclosure comprise non-azide compounds that comprise a substituted basic metal nitrate. The substituted basic metal nitrate can include a reaction product formed by reacting an acidic organic compound with a basic metal nitrate. The reaction is believed to occur between acidic hydrogen and a basic metal nitrate, such that the hydroxyl groups of the nitrate compound are partially replaced, however, the structural integrity of the basic metal nitrate is not compromised by the substitution reaction. In accordance with certain aspects of the present disclosure, the gas generant comprises a material including a substituted basic metal nitrate that is a reaction product of a nitrogen-containing heterocyclic acidic organic compound and a basic metal nitrate.

Examples of suitable acidic organic compounds include, but are not limited to, tetrazoles, imidazoles, imidazolidinone, triazoles, urazole, uracil, barbituric acid, orotic acid, creatinine, uric acid, hydantoin, pyrazoles, derivatives and mixtures thereof. Particularly suitable acidic organic compounds include tetrazoles, imidazoles, derivatives and mixtures thereof. Examples of such acidic organic compounds include 5-amino tetrazole, bitetrazole dihydrate, and nitroimidazole. According to certain aspects, a preferred acidic organic compound includes 5-amino tetrazole.

Generally, suitable basic metal nitrate compounds include basic metal nitrates, basic transition metal nitrate hydroxy double salts, basic transition metal nitrate layered double hydroxides, and mixtures thereof. Suitable examples of basic metal nitrates include, but are not limited to, basic copper nitrate, basic zinc nitrate, basic cobalt nitrate, basic iron nitrate, basic manganese nitrate and mixtures thereof. In accordance with certain preferred embodiments, the basic metal nitrate of the substituted compound includes basic copper nitrate.

Thus, in certain embodiments, enhanced burn rate gas generant compositions include a reaction product of a basic metal nitrate such as basic copper, zinc, cobalt, iron and manganese nitrates, basic transition metal nitrate hydroxy double salts, basic transition metal nitrate layered double hydroxides, and mixtures thereof reacted with an acidic organic compound, such as tetrazoles, tetrazole derivatives, and mixtures thereof.

Examples of representative substitution reactions, such as reactions (1) through (4) are provided below. Substituted basic metal nitrate reaction products are formed in such reactions, particularly, 5-amino tetrazole substituted basic copper nitrate (formed in Equation 1), bitetrazole dihydrate substituted basic copper nitrate (formed in Equation 2), and nitroimidazole substituted basic copper nitrates (formed in Equations 3 and 4), which are all suitable materials for use in the gas generant materials of the various embodiments of the present disclosure are as follows:

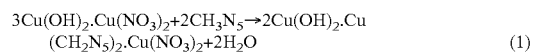  (1)

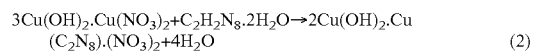  (2)

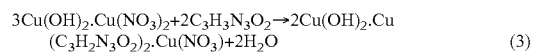  (3)

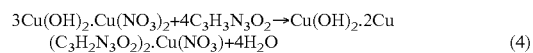  (4)

As appreciated by those of skill in the art, such fuel compositions may be combined with additional components in the gas generant, such as co-fuels. For example, in certain embodiments, a gas generant composition comprises a substituted basic metal nitrate fuel, as described above, and a nitrogen-containing co-fuel. A suitable example of a nitrogen-containing co-fuel is guanidine nitrate. The desirability of use of various co-fuels, such as guanidine nitrate, in the gas generant compositions of the present disclosure is generally based on a combination of factors, such as burn rate, cost, stability (e.g., thermal stability), availability and compatibility (e.g., compatibility with other standard or useful pyrotechnic composition components).

In some embodiments, the gas generant compositions include about 5 to about 95 weight % of the substituted basic metal nitrate compound. For example, an enhanced burn rate gas generant composition may include about 5 to about 95 weight % 5-amino tetrazole substituted basic copper nitrate. In certain embodiments, the pyrotechnic gas generant compositions include about 5 to about 60 weight % co-fuel. One particularly preferred gas generant composition includes about 5 to about 60 weight % of guanidine nitrate co-fuel and about 5 to about 95 weight % substituted basic metal nitrate.

As discussed above, in accordance with various aspects of the present disclosure, the gas generant is substantially free of polymeric binder. A gas generant material that is substantially free of polymeric binder has sufficient burn rates and combustion gas products such that it can also be substantially free of perchlorate-containing oxidizing agents (for example, ammonium perchlorate and/or potassium perchlorate). In such embodiments, a gas generant comprises less than about 5% by weight perchlorate-containing oxidizing agent, more preferably less than about 4% by weight, optionally less than about 3% by weight, optionally less than about 2% by weight, optionally less than about 1% by weight perchlorate-containing oxidizing agent, and in certain embodiments comprises 0% by weight of the perchlorate-containing oxidizing agent.

If desired, a gas generant composition in accordance with various aspects of the present disclosure may optionally include additional components such as: perchlorate-free oxidizing agents, slag forming agents, coolants, flow aids, viscosity modifiers, pressing aids, dispersing aids, phlegmatizing agents, excipients, burning rate modifying agents, and mixtures thereof. Such additives typically function to improve the stability of the gas generant material during storage; modify the burn rate or burning profile of the gas generant composition; improve the handling or other material characteristics of the slag which remains after combustion of the gas generant material; and improve ability to handle or process pyrotechnic raw materials.

As described above, certain undesirable oxidizing agents can be avoided in the gas generant compositions, for example, in certain embodiments, the gas generant is substantially free of perchlorate-containing oxidizing agents. In one embodiment, a suitable perchlorate-free oxidizing agent for use in the gas generant comprises a basic metal nitrate, such as basic copper nitrate. Basic copper nitrate has a high oxygen to metal ratio and good slag forming capabilities. Such perchlorate-free oxidizing agents can be present in an amount of less than or equal to about 50 weight % of the gas generant composition.

Other suitable additives include slag forming agents, flow aids, viscosity modifiers, pressing aids, dispersing aids, or phlegmatizing agents that can be included in the gas generant composition. The gas generant compositions optionally include a slag forming agent, such as a refractory compound, e.g., aluminum oxide and/or silicon dioxide. Generally, such slag forming agents may be included in the gas generant composition in an amount of 0 to about 10 weight % of the gas generant composition.

Coolants for lowering gas temperature, such as basic copper carbonate or other suitable carbonates, may be added to the gas generant composition at 0 to about 20% by weight. Similarly, press aids for use during compression processing, as will be described in greater detail below, include lubricants and/or release agents, such as graphite, and can be present in the gas generant at 0 to about 2%. While in certain aspects it is preferred that the gas generant compositions are substantially free of polymeric binders, in certain alternate aspects, the gas generant compositions optionally comprise low levels of certain acceptable binders or excipients to improve crush strength, while not significantly harming effluent and burning characteristics. Such excipients include microcrystalline cellulose, starch, carboxyalkyl cellulose, e.g., carboxymethyl cellulose (CMC), by way of example. When present, such excipients can be included in alternate gas generant compositions at less than 10% by weight, preferably less than about 5% by weight, and more preferably less than about 2.8%. Additionally, certain ingredients can be added to modify the burn profile of the pyrotechnic fuel material by modifying pressure sensitivity of the burning rate slope. One such example is copper bis-4-nitroimidazole. Agents having such an affect are referred to herein as pressure sensitivity modifying agents and they can be present in the gas generant at 0 to about 10% by weight. Such additives are described in more detail in U.S. patent application Ser. No. 11/385,376, entitled "Gas Generation with Copper Complexed Imidazole and Derivatives" to Mendenhall et al., the disclosure of which is herein incorporated by reference in its entirety. Other additives known or to be developed in the art for pyrotechnic gas generant compositions are likewise contemplated for use in various embodiments of the present disclosure, so long as they do not unduly detract from the desirable burn profile characteristics of the gas generant compositions.

Figure 4:
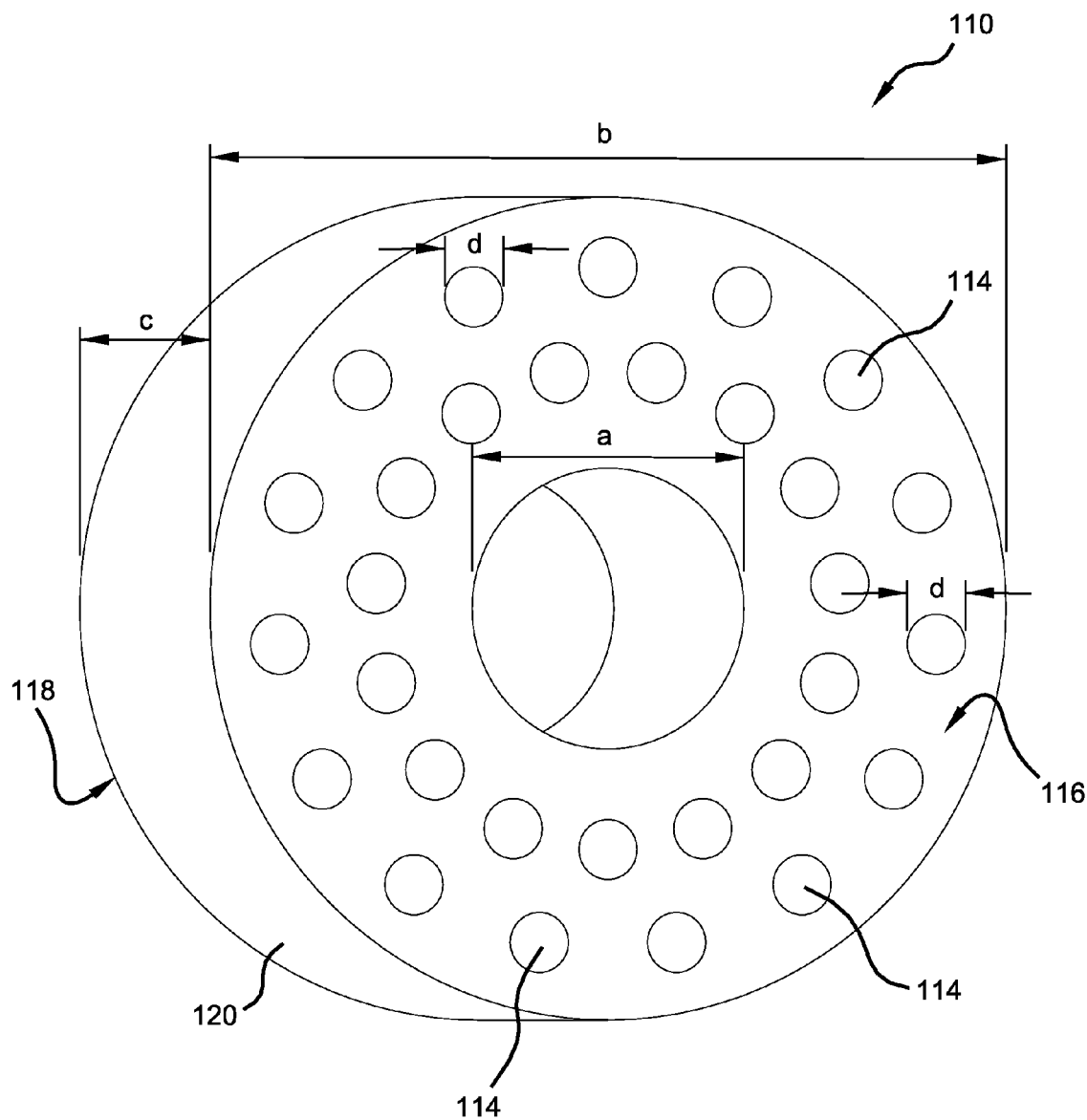
FIG. 4 is an isometric view of a pressed monolith gas generant in accordance with the principles of certain embodiments of the present disclosure.

FIG. 4 depicts a single monolithic gas generant grain shape 110 according to certain aspects of the present disclosure. The combustion pressure resulting from the burning of a monolithic annular disk grain shape 110 such as that shown in FIG. 4 is distinct from that of a conventional pellet (cylindrical shape) or wafer (a toroidal ring shape). The monolithic grain shape 110 shown in FIG. 4 is an annular disk. Exemplary dimensions of the grain shape 110 are an inner diameter "a" of about 14 mm, an outer diameter "b" of 41 mm, and a height "c" of about 22 mm. A plurality of apertures 114 extend from a first side 116 of the gas generant grain 110 to a second side 118 of the gas generant grain 110, thus providing open channels through the body 120 of the grain 110 that extend therethrough. As shown, each aperture 114 has a diameter "d" of about 3 mm. The gas generant grain 110 as shown has 30 apertures 114, although different configurations, dimensions, and quantities of the apertures 114 are contemplated. The number, size, and position of the apertures 114 may be varied, as they relate to the desired initial surface area and specific burn rate of the gas generant material. Similarly, the dimensions (a, b, and c) of the disk can also be varied, as appreciated by skilled artisans. For example, where multiple disks are employed as gas generant, the height "c" can be reduced.

The initial surface area of this grain shape 110 is relatively low, as compared to conventional pellet or wafer shapes, however, the burn rate of the gas generant material is sufficiently high to permit a low initial surface area that burns rapidly to expose additional surface area as the combustion reaction progresses. The initial surface area of the shape of the gas generant grain 110 as shown in FIG. 4 is less than 12,000 mm², specifically it is about 11,930 mm². In various embodiments, an initial surface area of the grain shape is less than about 13,000 mm². Traditional grain shapes require a higher initial surface area, for example greater than about 35,000 mm², inter alia, to achieve the necessary burn rate and gas combustion pressure to inflate an airbag cushion appropriately.

In accordance with the present disclosure, a ratio of the diameter of the each aperture to the length (L/D) is preferably from about 3.5 to about 9. In certain embodiments, the maximum ratio of L/D is 7.5. In the specific example shown in FIG. 4, the L/D ratio of each aperture is about 7.3. The ratio of L/D of the plurality of apertures relates to the surface area progression and overall burning behavior of the gas generant. The number of apertures and the ratio of L/D of each aperture relate to the shape or profile of the combustion pressure curve of the gas generant material.

The profile of the combustion pressure curve relates to the improved protection for occupants and it is preferable that the combustion pressure curve is progressive to neutral, in accordance with the principles of the present disclosure. The comparative conventional materials typically have regressive combustion pressure curves. The profile of this pressure curve relates to the amount of surface area of the gas generant which correlates to the mass of generant reacting, hence the mass gas generation rate ($m_g$) and pressure of gas generated over time. In this regard, a monolithic shape of the gas generant grain 110, similar to that shown in FIG. 4, provides a controlled combustion pressure that provides longer, controlled, and sustained combustion pressure at desired levels which is important for improving inflator effluent properties and for occupant safety during deployment of the airbag cushion.

This concept can also be expressed as a "rise rate" which is the rate at which the gas output from an inflator increases pressure (usually measured when the gas output is directed to a closed volume). It is commonly desirable that an inflatable restraint airbag cushion initially inflates in a relatively gradual manner to reduce injury to an occupant (particularly where the occupant is too close to the airbag or "out-of-position") which is then followed by a period where the inflation gas passes into the airbag cushion at a relatively greater or increased pressure rate. A gas generant that creates such inflation is commonly referred to in the art as producing inflation gas in an "S" curve. The gas generants of the present disclosure approach a rise rate having an S curve, which is highly desirable, particularly for out-of-position occupants. These features of the present disclosure will be described in greater detail in the context of FIG. 4.

In accordance with aspects of the various embodiments of the present disclosure, a monolithic grain design provides a lower rise rate, while providing a higher average combustion pressure and superior control over the burning characteristics. Additionally, in preferred embodiments, the absence of polymeric binder in the gas generant as compared to conventional extruded monolithic grains improves burning characteristics.

As discussed above, the gas generants according to various embodiments of the present disclosure provide improved effluent quality. This may be attributed to several aspects of the present disclosure, including that the gas generant composition is substantially free of polymeric binder and associated co-oxidizers such as perchlorates which raise the combustion flame temperature. Where combustion temperatures are higher, it has generally been observed that higher combustion temperatures result in greater levels or relative amounts of carbon monoxide (CO) and nitrogen oxides ($NO_x$) combustion products, for example. In accordance with various embodiments of the present disclosure, the maximum combustion temperature (also expressed as flame temperature) is less than about 2,300 K. In various embodiments, it is preferred that the flame temperature during combustion is from about 1400 K to about 2300 K. In certain embodiments, the flame temperature is less than about 2,000 K.

Table I compares effluent generated from a conventionally shaped gas generant in the form of a pellet with a pressed monolithic annular disk shaped gas generant similar to that shown in FIG. 4, each formed of the same gas generant composition having about 28% guanidine nitrate, about 13% basic copper nitrate, about 4% basic copper carbonate, about 3% silicon dioxide, and about 52% basic copper aminotetrazole nitrate. The U.S. Council for Automotive Research (US-CAR) issues guidelines for maximum recommended levels of effluent constituents in airbag devices. Desirably, the production of these effluents is minimized to at or below these guidelines. The current USCAR guidelines for all vehicle restraint devices are included in Table I. Also, ¼ of the USCAR guidelines (the typical apportionment for a driver airbag system) for effluent constituents (25% of the recommended levels) are included.

Table I shows effluent analysis during combustion of the gas generant by Fourier Transform Infrared Analysis (FTIR) showing that the nitrogen oxide species, which includes NO, $NO_2$, and $NO_x$ effluent gases are reduced and hence improved. As can be observed, a total amount of nitrous oxide species in the effluent is reduced by an amount of at least about 50% as compared to the pellet grain. For example, nitric oxide is reduced by about 68% and nitrogen dioxide by at least 50%. Nitrous oxide remains below the detection limit for both gas generants. Additionally, the particulate species generated in the effluent is also reduced.

Further, the effluent is substantially free of chloride species, such as HCl, as the gas generant is substantially free of perchlorate-containing oxidizing agents. Carbon monoxide and ammonia levels are substantially the same, which demonstrates improvement of certain effluent constituents without any detrimental increase with respect to other constituents. As can be seen from the data, monolithic grains having a neutral to progressive surface for a substantial portion of generant burn produce effluent constituents that are below ¼ of the USCAR guidelines, as where the traditional gas generant pellets having a highly regressive surface area exceed ¼ of the USCAR guidelines on some effluent constituents. Thus, the monolithic gas generant grains demonstrate a beneficial overall reduction in various effluent constituents versus traditional gas generant pellets having regressive surface areas and therefore low average combustion pressures. Effluent particulate output is also substantially decreased relative to traditional gas generant shapes, such as pellets.

TABLE I

| EFFLUENT SPECIES | PELLET (ppm) | MONOLITHIC (ppm) | USCAR Guideline (ppm) | ¼ USCAR Guideline (ppm) |
|---|---|---|---|---|
| Carbon Monoxide | 93 | 94 | 460 | 115 |
| Carbon Dioxide | 1,401 | 1,465 | 30,000 | 7,500 |
| Nitric Oxide | 35 | 11 | 75 | 18.75 |
| Nitrogen Dioxide | 2 | <1 | 4 | 1 |
| Nitrous Oxide | <43 | <43 | NA | NA |
| Ammonia | 6 | 7 | 35 | 8.75 |
| Particulate | 40 | 26 | 125 | 31.25 |

Other benefits of the present disclosure include simplification of hardware in the assembly of module. Many current inflatable restraint assemblies have a two-stage driver inflator, where two distinct gas generants are staged in an inflator device. The first gas generant has a burn rate and gas yield that provide sufficient gas product to inflate the airbag cushion for a first burning period, but are insufficient to sustain the cushion pressure for the required time through the entire impact/crash period. As such, a second gas generant (sometimes having a different composition) is ignited in a second stage, where it provides pressurized gas product to the bag for a second period during the impact. Such staging can also be used to proportionally respond to impact forces during collision, depending on the severity of the crash. However, two-stage drivers have complex mechanical hardware and control systems and are costly. Further, the dual gas generants can result in uncontrolled sympathetic ignition reactions.

For example, a common configuration for dual stage drivers includes nesting a second igniter system within a first igniter system. The dual igniters create redundancy for various hardware components, including containment equipment, electrical wiring, initiators, shorting clips, staging cups, lids, more complicated bases, and the like. Further, another gas generant loading station is required for the additional stage of generant. During operation, the control of combustion pressure during the second stage of firing is difficult because the first stage may still be firing and/or has already heated the surrounding area with pressurized gas. The flow area between the lid and cup can be inconsistent and combustion pressure can be difficult to control from the second stage. Further, complications can potentially occur by leakage of combustion gas from the first stage into the nestled second stage, where unintentional burning of the second stage generant can occur.

In accordance with various embodiments of the present disclosure, a gas generant is suitable for a single-stage driver inflatable restraint device, as the gas generant has a rapid reaction rate and sufficient sustained combustion pressure to eliminate any need for multiple stages of inflation without endangering occupants in an out-of-position (OOP) condition. Thus, all of the above described hardware and complications can be avoided via the use of the improved gas generants in a single stage according to various embodiments of the present disclosure. Thus, grain shapes similar to those of FIG. 4 can be used in a single stage inflator to provide superior OOP performance without the need for second stage operation and associated complex hardware.

The embodiments of the present disclosure can be further understood by the specific examples contained herein. Specific examples are provided for illustrative purposes of how to make and use the compositions and methods of the present disclosure and, unless explicitly stated otherwise, are not intended to be a representation that given embodiments of this present disclosure have, or have not, been made or tested.

EXAMPLE 1

In one example, a 5-amino tetrazole substituted basic copper nitrate fuel for the gas generant is formed by representative substitution reaction (1) set forth above. 72.7 lb of 5-amino tetrazole is charged to 42 gallons of hot water to form a 5-amino tetrazole solution. 272.9 lb of basic copper nitrate is slowly added to the 5-amino tetrazole solution. 5-aminotetrazole and basic copper nitrate are allowed to react at 90° C. until the reaction is substantially complete. To the reaction mixture are added 139.95 lb of guanidine nitrate and 14.45 lb of silicon dioxide. The slurried mixture is then spray dried.

A release agent (inert carbon, i.e., graphite) and 20.83 lb of basic copper carbonate (a coolant) are dry blended with the spray dried composition. The blended powder is placed in a pre-formed die having the desired shape, such as the annular disk shape with a plurality of apertures, as shown in FIG. 4, for example. The die and powders are placed in a large, high tonnage hydraulic press capable of exerting forces in excess of 50 tons. The raw materials are pressed to form a monolithic gas generant solid.

Figure 5:
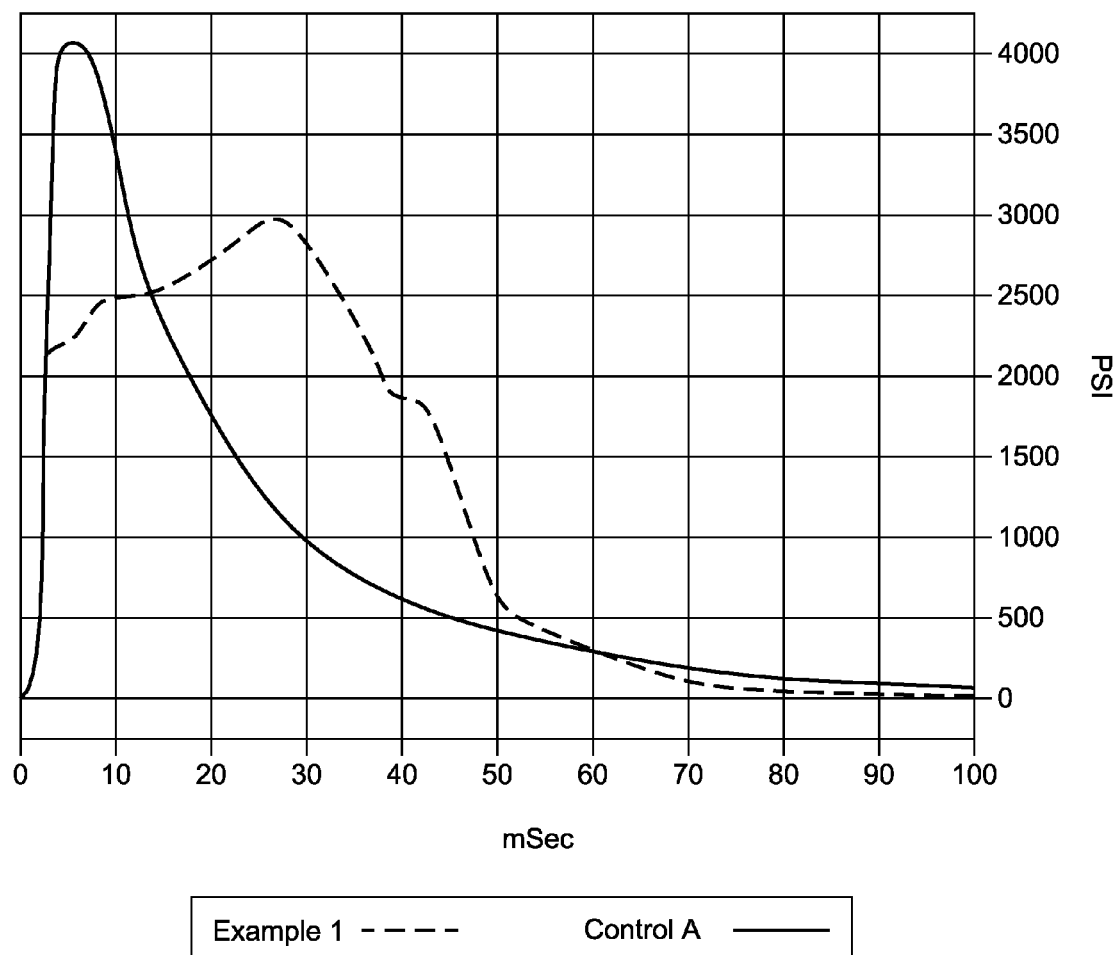
FIG. 5 is a graph of combustion pressure versus time, comparing a pressed monolith gas generant grain according to certain embodiments of the present disclosure with a comparative conventional gas generant pellet.

FIG. 5 is a graph showing combustion pressure versus time for a gas generant monolith formed according to Example 1 compared to a conventional pressed pellet designated Control A. Control A is formed by conventional tablet pressing. The gas generant compositions of both Example 1 and Control A are the same, as described above.

Example 1 and Control A are ignited at the same time (at approximately 2-3 milliseconds). As can be observed from FIG. 5, Control A generates an initial combustion pressure of 4,000 psi and peaks within 10 milliseconds. The combustion pressure falls below 2,000 psi for Control A at approximately 19 milliseconds. However, for various airbag applications, it is preferred that the combustion pressure remains over 2,000 psi for at least about 25 to 30 milliseconds, which improves effluent. Thus, if Control A were employed as the gas generant in an inflatable restraint device, it would most likely require a two stage design, with Stage I only being deployed in OOP situations to alleviate OOP forces on the occupant. Deploying only Stage I exposes less initial gas generant surface area, thus proportionately reducing initial mass and inflating flow (the product of moles generated and temperature). Further, the shape of the pressure curve over time for Control A has a large initial slope (a high rise rate, as described above). The shape of the pressure curve is regressive, as the peak pressure is reached within about 5 milliseconds of initial burning. The pressure then regresses (i.e., decreases) for the remainder of burning time (here greater than 75 milliseconds).

As can be observed, the gas generant of Example 1 creates a combustion pressure that is greater than 2,000 psi for over 35 milliseconds. Further, combustion pressure is lowest at the beginning of operation, which is highly desirable for reducing out-of-position occupant injuries. In various embodiments, it is preferred that the combustion pressure does not exceed about 3,500 psi for considerations related to the structure of the inflator. In various embodiments of the present disclosure, the pressure generated by the gas generant is from about 2,000 psi to about 3,000 psi for at least 30% of the burning period, preferably for at least about 40% of the burning period, preferably for at least about 45-75% of the burning period. These pressure parameters improve effluent quality by reducing undesirable species.

Later in operation as the gas generant grain burns back, burning surface area increases substantially, allowing the gas production for the inflator to effectively increase. In this regard the initial mass flow and/or inflating flow of the gas generant of Example 1 is much lower with the monolithic grain shape than with pellets traditionally used in pyrotechnic inflators (i.e., in Control A). Thus, the rise rate or slope of pressure increase over time is more gradual than the rise rate of Control A. For example, a slope of the pressure curve is slightly progressive with increasing pressure until the maximum pressure is reached at about 28 milliseconds. After the peak pressure is reached, burning continues and the pressure curve slope decreases. This progressive behavior is highly desirable and is closely related to the surface area, including the number of apertures and their respective L/D ratios, as well as the burn rate, gas yield, and density of the monolith solid gas generant grains of the present disclosure. This combustion pressure profile results in acceptable or improved bag inflation and occupant restraint as shown by linear impactor testing. For example, a lower rise rate of the gases produced by the gas generant (a lower slope) relates to improved out-of-position occupant (reduced injury) results.

Figure 6:
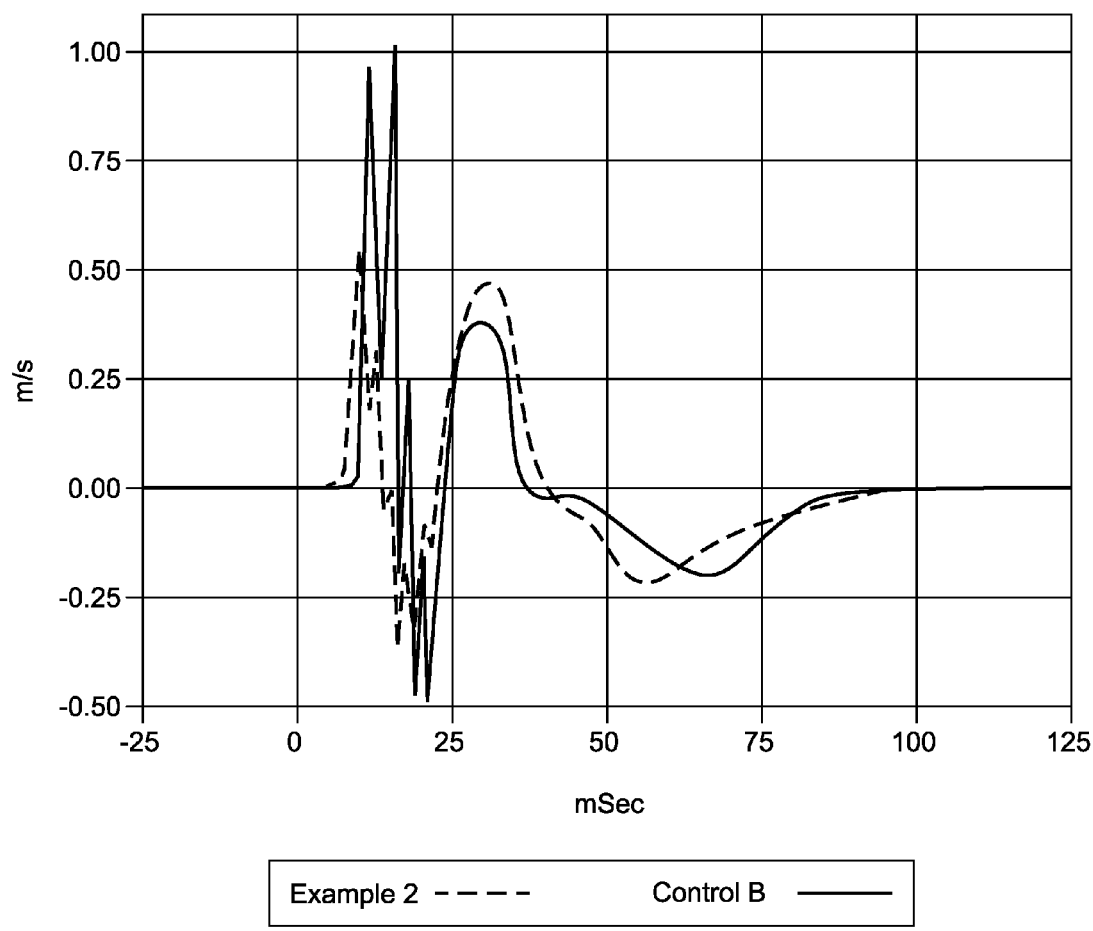
FIG. 6 shows viscous injury criterion (V*C) out-of-position (OOP) test results for a monolith gas generant grain according to certain embodiments of the present disclosure as compared to a conventional gas generant pellet.

In some collision events, the vehicle occupant may be out-of-position, or in a location not anticipated by the design of the inflatable restraint system. Such occupants may be subject to a higher risk of injury by a deploying airbag because of their improper placement. The higher the initial combustion pressure (or more specifically, the higher the initial inflating flow), the greater the likelihood of injury for an out-of-position occupant. FIG. 6 is a graph demonstrating one aspect of occupant out-of-position (OOP) improvement according to various aspects of the present disclosure.

Example 2 and Control B are gas generants incorporated into inflatable restraint devices of an automobile. Testing using a single stage inflator with the above monolithic pressed grain shows substantial improvement in both chest G's and V*C injury criteria. The airbag assembly of Example 2 contains a monolithic gas generant having 46.6% basic copper nitrate, 50.4% guanidine nitrate, 2.7% aluminum oxide, and 0.3% silicon dioxide. The airbag assembly of Control B contains a gas generant similar to that described above in Example 1 for Control A. FIG. 6 measures viscous criterion (V*C) for chest injuries to an OOP occupant in a static module deployment test (Toyota position 2, chest on the driver module). The maximum velocity ($V*C_{max}$) sustained by the dummy chest for Example 2 occurred at 11.9 milliseconds (msec) and was 0.59 meters per second. Control B $VC_{max}$ occurred at 15.0 msec and was 1.02 m/s. As such, the VCmax for Example 2 gas generant according to certain embodiments of the present disclosure was reduced by over 40% (about 42%) for an out-of-position occupant, as compared to the traditional Control B pellet.

FIG. 7 shows a comparison of inflatable restraint assemblies containing gas generants according to the certain embodiments of the present disclosure (Examples 3 and 4, which are gas generants having a composition like Example 2) and conventional pellet gas generants (Controls C and D like Control A) having roughly the same total energy. Dummies were accelerated to 15 miles per hour in a linear impactor tester. The G forces sustained by the dummy are shown in FIG. 7. Examples 3 and 4 according to the present disclosure have lower maximum G load, less than about −23 G's than the comparative Control C and D, which had G force of greater than −25, where Control C=−26 G's and Control D=−29 G's.

FIG. 8 shows another test of OOP occupants comparing the maximum G forces in OOP module deployment testing for Example 5, a monolithic pressed gas generant grain according to certain embodiments of the present disclosure having a gas generant composition like that of Example 2. Comparative example Control E is a pellet similar to Control A described above, a tablet having a diameter of 0.5 inches and a thickness of 0.07 inches. FIG. 8 shows that an out-of-position occupant sustains less chest load and has improved injury criteria from an inflatable airbag assembly containing a gas generant of Example 5 as compared to one containing Control E. The maximum G force sustained by the OOP dummy was less than—24 G (−23.8 G) for Example 5, as where Control E is greater than about 35 (−36.2 G's). Thus, the chest load for gas generants prepared and used in accordance with the principles of the present disclosure provide a 31% reduction in chest load for an OOP occupant.

The shape of such pressed monolithic gas generant grains according to various embodiments of the present disclosure not only improves effluents, but it also significantly improves the out-of-position (OOP) characteristics of the module employing an inflator with such a grain.

High burning rate gas generants (preferably greater than or equal to about 1.6 in/sec at 3000 psi) having high mass density (preferably greater than or equal to 1.9 g/cm$^3$) and high gas yield (preferably greater than or equal to about 2.4 moles per 100 grams) are desirable to take full advantage of the shapes providing low initial surface area and progressive surface area during burning. In certain alternate embodiments, similar grain shapes can be extruded to provide similar surface area progressively. In other embodiments, a plurality of monolithic pressed grains can be used as gas generants. Such grains can have reduced dimensions from single monolithic grains.

Various embodiments of the present disclosure provide a gas generant for use in an inflatable restraint device that provides an initial surface area that is low as compared to conventional wafers and pellets, thus improving OOP behavior. As the grain burns, surface area increases, maintaining or even improving total occupant restraint. The gas generant grain maintains combustion pressure above 2,000 psi for a large duration of burn, while not exceeding 3,500 psi. In other words, in various embodiments, gas generant grains of the present disclosure have considerably higher average combustion pressure than traditional gas generant pellets or wafers.

Further improvement in effluent quality is achieved by other aspects of certain embodiments of the present disclosure, where gas generant grains are formed by pressing the monolithic grain, as opposed to extruding the gas generant formulation. In this regard, the gas generant grain is substantially free of polymeric binder and has robust stability due to formation by application of compressive strength. In certain embodiments, the actual density of the gas generant grain is greater than 95% of the maximum theoretical density. The burn rate, combustion profile, and effluent quality are significantly improved by the absence of binder compositions. In certain embodiments, the gas generant grain is further substantially free of perchlorate-containing oxidizing agents.

The present disclosure still further provides pyrotechnic compositions that are economical to manufacture. The present disclosure additionally provides a burn rate enhanced gas generant composition that overcomes one or more of the limitations of conventional gas generants.

What is claimed is:

1. An inflatable restraint device comprising:
    an airbag for restraining motion of a vehicle occupant; and
    at least one gas generant for inflating the airbag in the form of a monolithic annular disk having a plurality of apertures comprising a first aperture that has a first diameter and a second aperture that has a second diameter, wherein the first diameter is greater than the second diameter and further having a linear burn rate of greater than or equal to about 1.6 inches per second at a pressure of about 3,000 pounds per square inch, wherein the at least one gas generant is substantially free of polymeric binder, azides, and perchlorate-containing oxidizing agents and produces an effluent for inflating the airbag that is substantially free of chloride-containing species and has a total amount of nitric oxide of less than 18.75 ppm and particulate of less than 31.25 ppm.

2. The device of claim 1, wherein the second aperture has a ratio of length to diameter of about 3.5 to about 8 and an initial surface area of the monolithic annular disk is less than about 13,000 mm$^2$.

3. The device of claim 1, wherein the first aperture defines a central aperture of the monolithic annular disk.

4. The device of claim 1, wherein the plurality of apertures further comprises a plurality of the second apertures.

5. The device of claim 1, wherein a product of a mass density and a gas yield of the at least one gas generant is greater than or equal to about 5.2 moles/100 $cm^3$.

6. The device of claim 1, wherein a combustion pressure in the inflatable device is less than or equal to about 3,500 pounds per square inch and greater than about 2,000 pounds per square inch for at least 25 milliseconds.

7. The device of claim 1, wherein the at least one gas generant comprises a substituted basic metal nitrate, wherein the substituted basic metal nitrate includes a reaction product of an acidic organic compound and a basic metal nitrate.

8. The device of claim 1, wherein the at least one gas generant is used with a single-stage driver to inflate the airbag.

9. The device of claim 1, wherein a total amount of nitrous oxide species in the effluent is reduced by an amount of at least about 50% for the monolithic annular disk gas generant as compared to a comparative effluent from a pellet having the same gas generant composition as the monolithic annular disk.

10. An inflatable restraint device comprising:
an airbag for restraining motion of a vehicle occupant; and
at least one gas generant for inflating the airbag in the form of a monolithic annular disk having a plurality of apertures comprising a first aperture having a first diameter and a second aperture having a second diameter, wherein the first diameter is greater than the second diameter, wherein the at least one gas generant further has a linear burn rate of greater than or equal to about 1.6 inches per second at a pressure of about 3,000 pounds per square inch, a product of a mass density and a gas yield of the gas generant is greater than or equal to about 5.2 moles/100 $cm^3$, and wherein the gas generant is substantially free of polymeric binder and azides, and a combustion pressure in the inflatable device is less than or equal to about 3,500 pounds per square inch and greater than about 2,000 pounds per square inch for at least 25 milliseconds.

11. The device of claim 10, wherein the second aperture has a ratio of length to diameter of about 3.5 to about 8 and an initial surface area of the monolithic annular disk is less than about 13,000 $mm^2$.

12. The device of claim 10, wherein the first aperture defines a central aperture of the monolithic annular disk and the plurality of apertures further comprises a plurality of second apertures.

13. The device of claim 10, wherein the at least one gas generant comprises a substituted basic metal nitrate, wherein the substituted basic metal nitrate includes a reaction product of an acidic organic compound and a basic metal nitrate.

14. The device of claim 10, wherein the at least one gas generant is used with a single-stage driver to inflate the airbag.

15. A gas generant for an inflatable restraint device comprising an annular disk having a plurality of apertures comprising a first aperture that has a first diameter and a second aperture that has a second diameter, wherein the first diameter is greater than the second diameter, wherein a linear burn rate of the gas generant is greater than or equal to about 1.6 inches per second at a pressure of about 3,000 pounds per square inch, wherein a product of a mass density and a gas yield of the gas generant is greater than or equal to about 5.0 moles/100 $cm^3$, and wherein the gas generant is substantially free of polymeric binder, perchlorate-containing oxidizing agents, and azides, wherein an effluent produced by the gas generant during burning is substantially free of chloride-containing species and has a total amount of nitric oxide of less than 18.75 ppm and particulate of less than 31.25 ppm and a combustion pressure in the inflatable restraint device is less than or equal to about 3,500 pounds per square inch and greater than about 2,000 pounds per square inch for at least 25 milliseconds.

16. The gas generant of claim 15, wherein the second aperture has a ratio of length to diameter of about 3.5 to about 8 and an initial surface area of the annular disk is less than about 13,000 $mm^2$ and the gas generant is in a final pressed form that has an actual density of greater than or equal to about 95% of the maximum theoretical mass density of the gas generant.

17. The gas generant of claim 15, wherein the gas generant has a mass density of greater than or equal to about 1.9 $g/cm^3$ and a gas yield of greater than about 2.4 moles per 100 g of gas generant.

18. The gas generant of claim 15, comprising a substituted basic metal nitrate, wherein the substituted basic metal nitrate includes a reaction product of an acidic organic compound and a basic metal nitrate.

* * * * *